INVENTORS:
FRANK SOLOMON
RENATO DI PASQUALE
BY Irving Holtzman
ATTORNEY

INVENTORS:
FRANK SOLOMON
RENATO DI PASQUALE

BY Irving Holtzman

ATTORNEY

United States Patent Office 3,156,586
Patented Nov. 10, 1964

3,156,586
SEA-WATER BATTERY
Frank Solomon, Lake Success, N.Y., and Renato Di Pasquale, Rutherford, N.J., assignors to Yardney International Corp., New York, N.Y., a corporation of New York
Filed Feb. 8, 1961, Ser. No. 87,943
2 Claims. (Cl. 136—100)

This invention relates to electrochemical generators of energy such as primary batteries. More particularly the invention relates to batteries which employ salt water as an electrolyte and are generally known as sea-water batteries.

In batteries employing sea water as the electrolyte, problems arise in assuring a free and even circulation of electrolyte over the battery plates. This is due in large part to the fact that said battery plates become bent along their edges or become improperly spaced, thereby preventing proper entrance and circulation of sea water between the electrochemically active surface portions of the plates. The present invention solves these problems.

It is an object of this invention to provide a sea-water battery in which a free and even circulation of electrolyte over the battery plates is assured.

A still further object of this invention is to provide a sea-water battery containing plates which are supported in spaced relationship along their edges to prevent any bending capable of interfering with water circulation between the plates.

The objects of the present invention are accomplished by providing a sea-water battery having a plurality of electrode plates (preferably bipolar plates) whose faces of opposite polarity are spaced apart by a set of internal spacers and a plurality of non-conductive marginal spacers adjacent the peripheries of the plates. In a preferred embodiment of this invention the internal plate spacers are distributed over and imbedded in the central portion of at least one surface of alternate plates. Various embodiments of the present invention are illustrated in the accompanying drawing in which.

Figure 2:
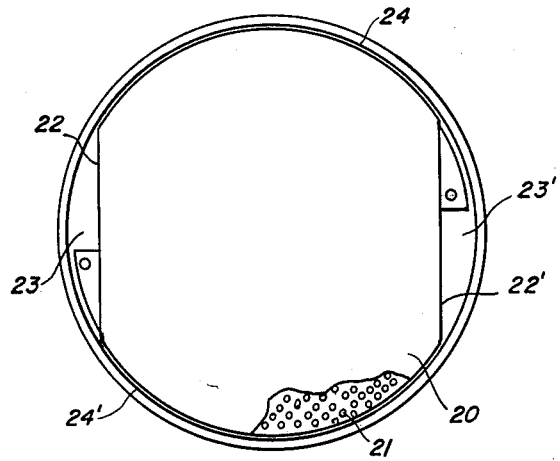
FIG. 2 is a cross-sectional view of the battery according to FIG. 1, taken along line 2—2 of FIG. 1, parts of a plate being broken away to expose details of the surface of a plate below.

In the drawing, wherein like numerals designate the same parts in the various views, a sea-water battery embodying the present invention is shown generally at 1 and comprises a cylindrical housing 2 having an upper removable cover 4 and a lower removable cover 6. When the battery is installed for use, covers 4 and 6 are removed to allow for circulation of sea water through the battery in a manner described in more detail below.

Battery 1 is provided with a pair of negative end plates 12, and 12' disposed at opposite ends of its electrode stack, which are electrically connected to each other by means of a negative bus bar 14. A single positive plate 16 is disposed intermediate the negative plates 12 and 12' and is electrically connected to a positive bus bar 18.

Figure 1:
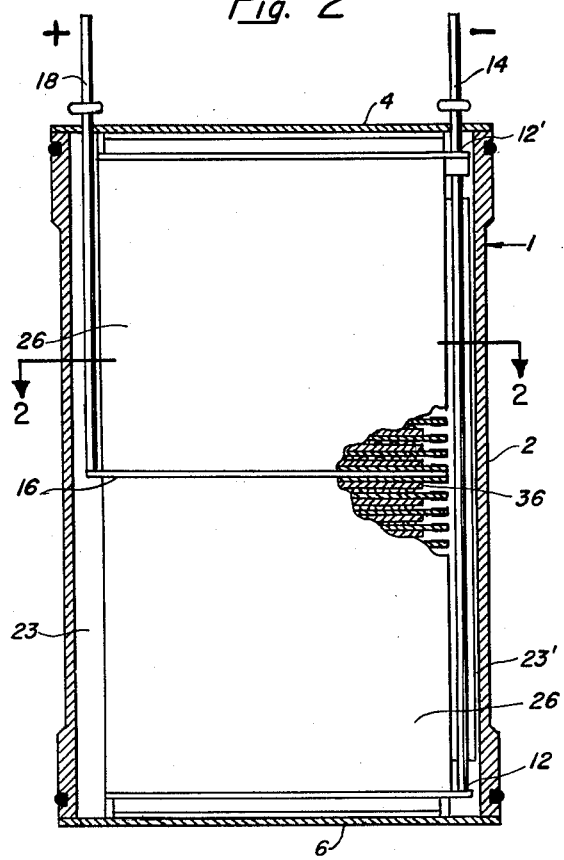
FIG. 1 is a front elevation, partly in section, of a sea-water battery embodying features of the present invention.

The electrode stack of battery 1 consists of a plurality of bipolar plates 20, described in more detail below, each having a pair of straight edges 22 and 22' and a pair of curved edges 24 and 24'. In the embodiment illustrated in FIG. 1, potting compound 26 is used to coat the curved edges of the battery plates whereas the straight edges 22 and 22' are left free from compound and the space between the plates at this point is kept open to allow for free circulation of sea water between the plates. The potting compound 26 serves to secure the battery plates 20 in position along the inner wall of cylindrical housing 2. Straight edges 22 and 22' are spaced inwardly from housing 2 and collectively form vertical channels 23 and 23' through which sea water may circulate.

Figure 3:
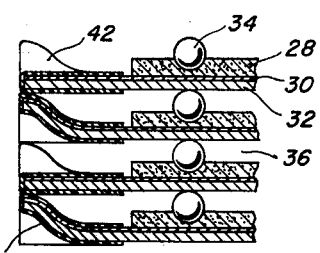
FIG. 3 is an enlarged view of the cutaway section of FIG. 1, illustrating the details of the peripheral plate structure.

The details of the battery plates 20 are best seen in FIG. 3. Plate 20 comprises a layer 28 of silver chloride whose surface has been developed to give it a coating of metallic silver, an intermediate silverfoil layer 30 and a sheet of magnesium 32. Both the silver foil 30 and the magnesium sheet 32 extend laterally beyond the edges of the silver-chloride layer 28. A plurality of beads 34 made of glass or similar non-conductive material are imbedded and distributed over the surface of the silver-chloride layer 28 so that they project upwardly therefrom. These beads serve to maintain the battery plates 20 in spaced relationship at their internal regions, i.e., within the confines of layers 28, thereby forming horizontal channels 36 through which the sea water may circulate.

Each layer 28 is also provided with a plurality of holes 21 which are cut through from the top to the bottom surface thereof. The surfaces defining these holes are also developed so as to form coatings of silver which electrically interconnect the upper and lower developed surfaces of the layer.

The entire periphery of plate 20 is provided with insulating tape 40 which surrounds both the silver-foil layer 30 and the magnesium layer 32. This acts to prevent shorting in the areas near the edges of the plates.

To insure the spacing of the battery plates 20 along the straight edges 22 and 22' which are prone to deformation during use, each composite sheet 32, 30 together with its insulating strip 40 is formed into a series of peripherally spaced marginal funnel-like undulations or bulges 42 of outwardly flared configuration. These bulges 42, acting as marginal spacers, are peripherally offset from those of adjoining plates and are open toward the plate edge so as not to obstruct the flow of electrolyte between the plates. As will be seen from FIGS. 3 and 4, the internal spacers means (beads 34) extend from the silver-chloride layer 28 of one plate to the magnesium sheet of the plate lying above it. The marginal spacers 42, however, extend from one magnesium sheet to the next magnesium sheet and are electrically separated from each other by means of the insulating tape 40. Thus, as shown, they are tangent to a plane that is parallel to the electrode faces (i.e., horizontal in FIGS. 3 and 4) and rise substantially to the same level as the internal spacers 34.

The developed silver-chloride sheet serves as the positive plate for a cell of the sea-water battery whereas the magnesium sheet acts as the negative plate. The silver foil 30 functions as a collector and conveyor for current from the negative plate of one cell (magnesium sheet) to the positive plate of the next cell (silver-chloride sheet). External wires or bars for conducting current from one cell to another are thus eliminated.

Figure 5:
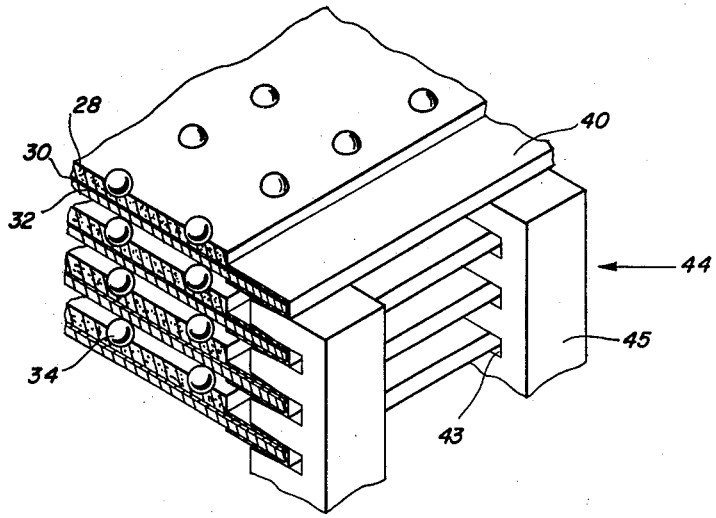
FIG. 5 is a partial isometric view of an assembly of battery plates and periphery-supporting means therefor illustrating a modification of the system of the preceding figures.

FIG. 5 illustrates another embodiment of this invention which employs a rack or comb 44 made of plastic (Teflon, nylon) or other light and rigid dielectric material, impervious to sea water and other chemicals, as the means for supporting the edges of the battery plates 20. The rack comprises a base 45 into which are cut slots 43 which serve to support and hold the battery plates 20 separated from each other at their peripheries. It is to be understood that this rack may replace the marginal spacer means 42 of the embodiment shown in FIG. 1. A number of racks spaced from one another around the periphery of the plates are preferably used. It is preferred to use three or four racks of this character.

Figure 6:
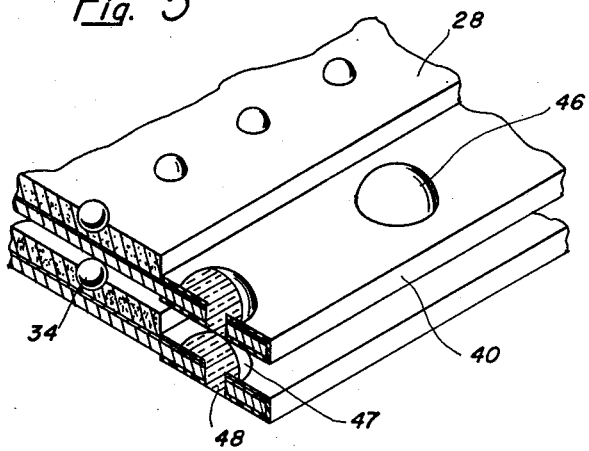
FIG. 6 is also a partial isometric view of an assembly of battery plates and periphery-supporting means therefor, illustrating another modification of that system.

FIG. 6 illustrates another embodiment of the marginal spacer means of the present invention. In this case the spacer means is a series of buttons 46 each having a head 47 and a shaft 48. Buttons 46 are also made of any suitable dielectric material which is light, rigid and impervious to sea water and other chemicals, e.g., glass or plastic (Teflon, nylon). Buttons 46 are secured at spaced intervals adjacent the straight edges 22 and 22' of the battery plate in any suitable manner. The marginal spacer means may also take the form of a wedge or block. Furthermore, a combination of marginal-spacer forms may also be employed. Head 47 of buttons 46 overlies insulation tape 40, silver foil 30 and magnesium sheet 28, but not silver-chloride sheet 28.

Figure 4:
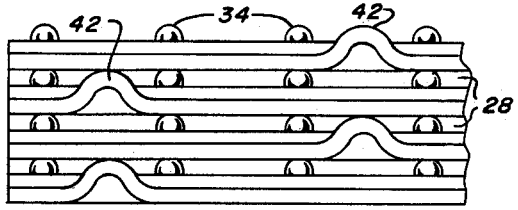
FIG. 4 is side elevation of the structure of FIG. 3.
Figure 7:
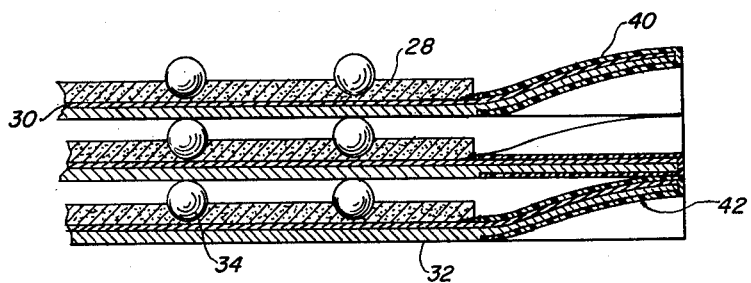
FIG. 7 is a partial cross-sectional view, similarly to FIG. 3, of an assembly of battery plates according to this invention illustrating an improved disposition of insulating tape on the marginal portions of the plates.
Figure 8:
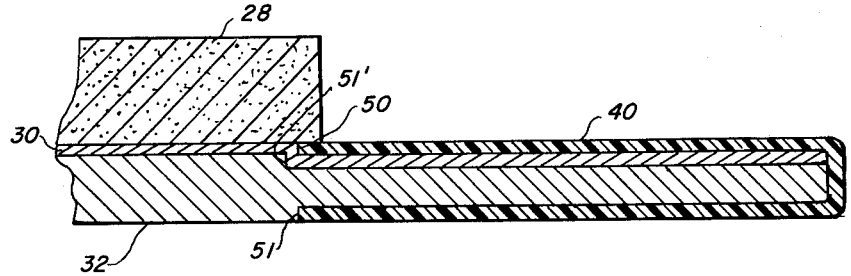
FIG. 8 is an enlarged cross-sectional view of a somewhat modified plate similar to those shown in FIG. 7.

FIGS. 7 and 8 illustrate another facet of this invention. They show an embodiment wherein the insulation tape 40 is secured in the region of its upper inner edge 50 between silver-chloride sheet 28 and magnesium sheet 32. To further insure the proper seating and retention of the insulating tape 40 and the silver foil 30 along the border of the magnesium plate 32, shoulders 51 and 51' (see FIG. 8) are formed in the lower and the upper surface, respectively, of magnesium plate 32. The marginal spacers 42 are shown in profile view in FIGS. 7 and 8 of the drawing. It will be noted that it tapers inwardly from the edge, substantially as shown in FIGS. 3 and 4 of the drawing.

In the embodiment described above, the marginal spacers for the battery plates are installed adjacent the straight edges of the plates to separate adjoining plates. This is the preferred construction since the sea water will usually enter and leave the space between the plates only at the straight edges of the plates. Furthermore, as a result of this construction each plate is supported at its points of contact with the spacer means and is thereby reinforced against distortiton from shock. A high degree of reliability is thus obtained so that the battery can be submitted to greater shock and still continue to operate.

Numerous modifications of the disclosed embodiments of this invention can be made without departing from the spirit and scope thereof, it being understood that the invention is not to be limited to specific details of the foregoing disclosure except as defined in the appended claims.

What is claimed is:
1. A primary electric battery, comprising:
housing means;
a plurality of bipolar electrodes disposed in stacked relationship within said housing means with faces of one polarity confronting faces of opposite polarity of adjacent electrodes and spaced therefrom for enabling the flow of an electrolyte therebetween;
conductor means for drawing electric current from said electrodes, each of said electrodes comprising a plate of one polarity with a layer of a material of opposite polarity disposed thereon, said plates each extending outwardly beyond the confines of the respective layer to form a marginal portion free from said layer, said portion being deformed along the plate edge into a plurality of peripherally spaced undulations which are outwardly flared in funnel-like manner and offset from corresponding undulations of adjacent plates, said undulations being tangent to a plane parallel to said faces;
internal spacer means inwardly of the confines of each of said layers for spacing it from a respective plate of an adjoining electrode to permit the flow of electrolyte between adjacent electrodes, said internal spacer means rising substantially to the level of said undulations; and
an insulating strip overlying said marginal portions and said undulations, said undulations contacting the adjoining face of a respective adjacent electrode through said strip for separating the adjacent electrodes along their marginal portions and for preventing deformation of said marginal portions by a flow of said electrolyte through said housing means between said electrodes.

2. A primary electric battery as defined in claim 1 wherein the marginal areas of said plates are provided with a shoulder on each broad surface thereof, said insulating strip having inner edges seated against said shoulders, one of said inner edges being overlain by a peripheral portion of said layer.

References Cited in the file of this patent

UNITED STATES PATENTS

| | | |
|---|---|---|
| 1,116,818 | Holmes | Nov. 10, 1914 |
| 2,187,638 | Zernike | Jan. 16, 1940 |
| 2,706,213 | Lucas | Apr. 12, 1955 |
| 2,745,892 | Chubb et al. | May 15, 1956 |
| 2,970,181 | Corren | Jan. 31, 1961 |
| 2,988,587 | Haring | June 13, 1961 |
| 3,005,864 | Sharpe | Oct. 24, 1961 |
| 3,061,659 | Wilke et al. | Oct. 30, 1962 |

OTHER REFERENCES

Electrical Review, April 11, 1947, page 571.
Electronic Industries, November 1946, page 75.